Feb. 27, 1968 S. C. FORREST, JR., ETAL 3,371,291

CURRENT CONTROL OF OSCILLATOR FREQUENCY

Filed Jan. 11, 1965

STANLEY C. FORREST, JR.
LEONARD SCHUPAK
INVENTORS.
BY White & Haefliger
ATTORNEYS.

3,371,291
CURRENT CONTROL OF OSCILLATOR FREQUENCY

Stanley C. Forrest, Jr., Santa Ana, and Leonard Schupak, Tustin, Calif., assignors to Astrodata, Inc., Anaheim, Calif., a corporation of California Filed Jan. 11, 1965, Ser. No. 424,558
7 Claims. (Cl. 332—30)

ABSTRACT OF THE DISCLOSURE

The disclosed oscillator produces an output frequency that is linearly related to the instantaneous amplitude of variable input current. It incorporates a charge storing device connected via a summing junction with multiple current paths one of which supplies the variable input current and others of which provide charge and discharge current. Charge current is controlled to produce cycling of the stored charge.

This invention relates generally to electrical signal generation and more particularly concerns a novel oscillator circuit providing an output signal frequency linearly related to the instantaneous amplitude of a variable input current.

While there are many different prior forms of voltage controlled oscillators, none of these of which I am aware provide the unusual combinations of features of construction, and improvements in function, mode of operation and results exemplified in the present oscillator. Such features include extreme linearity of output frequency as a function of variable input current, the absence of reactive components, the use of an auxiliary source of oscillation such as a crystal controlled auxiliary oscillator as a reference, self-stabilization, and filtering out of outside effects.

Basically, the oscillator includes an electrical charge storing or current integrating means, and a network including predetermined charge and discharge current paths and a variable current path wherein these paths are coupled with the charge storing means for cycling the stored charge at a variable rate determined by the predetermined and variable current flow, whereby the rate of cycling of the stored charge is usable to control the output frequency of the oscillator. In accordance with a major object of the invention, the network includes an auxiliary source of oscillations of frequency $f_x$, and the stored charge is cycled at a frequency $f_v$ which varies linearly with variable input current, and also varies proportionally with $f_x$. The latter frequency may be established, for example, by a crystal controlled auxiliary oscillator, or may be established from a recording or other source as a reference frequency synchronized with the intelligence from which the variable input current is derived.

More specifically, the unusual network includes a summing junction connected with the charge storing device, first and second unidirectional current flow legs connected to the junction to provide the charge and discharge current flow paths, and a third leg connected to the junction to provide the variable current flow path. The network also may include an auxiliary source of oscillation and means connected with the first leg to periodically interrupt flow of charge current to the junction in response to operation of the auxiliary source of oscillations, thereby to establish periodic net discharge of the charge storage device. Further, means such as a comparator is provided to produce an output frequency signal in response to detection of cycling (as for example threshold arrival) of output voltage at the charge storage means; the output frequency signal is then usable, along with the output of the auxiliary oscillator, to periodically operate the means intercepting flow of charge current to the summing junction, with the result that charging and discharging of the charge storage device is controlled in an unusually effective manner providing the extreme linearity mentioned above.

These and other objects and advantages of the invention, as well as the details of illustrative embodiments, will be more fully understood from the following detailed description of the drawings in which.

Figure 1:
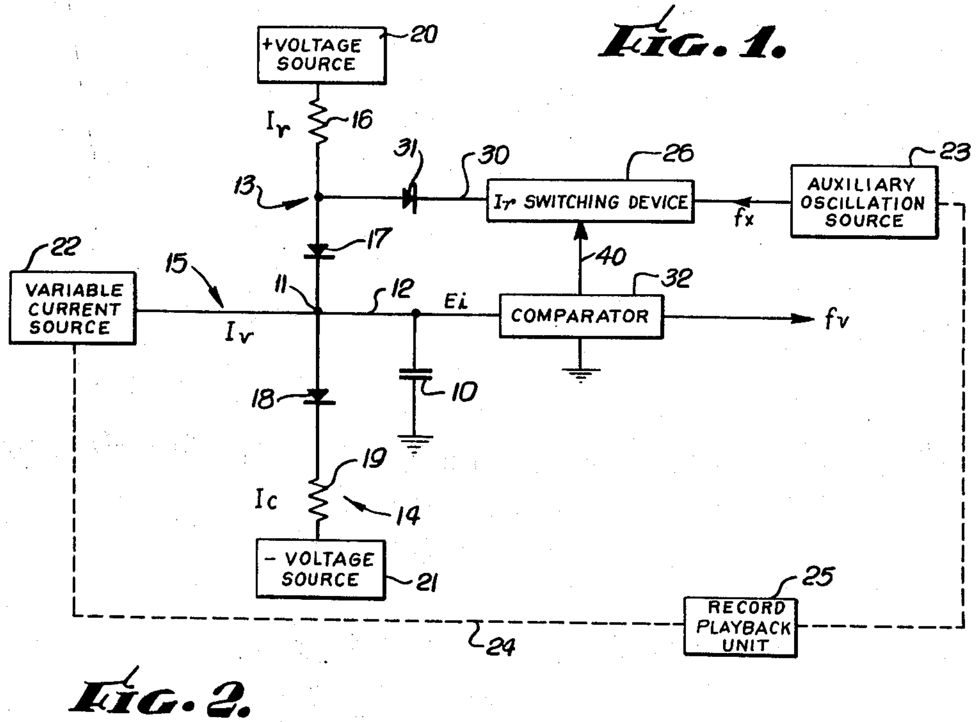
FIG. 1 is a circuit diagram of one preferred form of the new oscillator.

Referring to the drawings, FIG. 1 depicts one form of charge storing means, as for example the timing capacitor 10, as well as one form of network including predetermined charge and discharge current paths and a variable current path, wherein these paths are coupled to the charge storing means in such manner as to cycle the stored charge at a rate determined by the predetermined and variable current flow. In the specific example shown, the network includes a summing junction 11 connected at 12 with the capacitor 10, a first unidirectional current flow leg indicated generally at 13 and connected to the junction 11 to provide the charge current path, a second unidirectional current flow leg indicated generally at 14 and connected to the junction 11 to provide the discharge current path, and a third leg indicated generally at 15 and connected to the junction 11 to provide the variable current path.

Network leg 13 is shown to include an appropriate resistor 16 and diode 17, and likewise leg 14 incorporates diode 18 and resistor 19, suitable positive and negative voltage sources 20 and 21 being connected to the respective legs 13 and 14. In this regard, current $I_r$ through leg 13 may be designated "charge" current, whereas current $I_c$ through leg 14 may be designated "discharge" current. Variable current $I_v$ passing through leg 15 may be supplied from a source as is indicated at 22 and also characterized as associated with a variable input control voltage by which the input current is determined. The sum of the currents at junction 11 is represented by the expressions $(I_v-I_c+I_r)$, or $(I_v-I_c)$ depending upon whether a switching device 26 for $I_r$ is set or reset, as described below.

The network may also be considered to include an auxiliary source of oscillations or clock pulses, such as is indicated at 23, such oscillations being assigned the frequency symbol $f_{x'}$. Examples of source 23 include a crystal controlled oscillator or clock, or a reference frequency such as a recording or other source which may also have an intelligence signal recorded thereon. In this regard, the variable current $I_v$ may be derived from such a recorded intelligence signal, and the broken line 24 indicates the common derivation of variable current $I_v$ and the reference signal or oscillations $f_x$ from such a recording indicated at 25.

Figure 2:
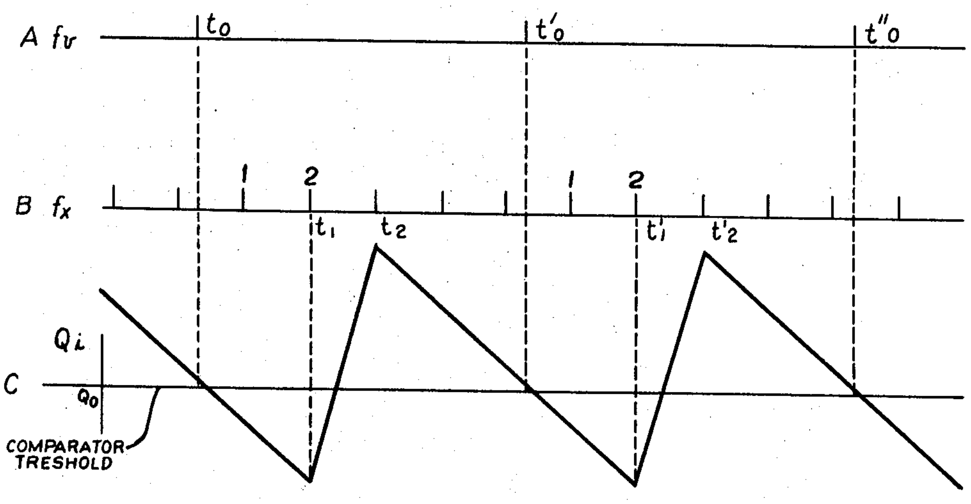
FIG. 2 is a graphical representation of the oscillator operation when the input current is a constant.

Further, the network may be considered to include means connected with the first leg 13 to periodically interrupt flow of current to the junction 11 in response to operation of the oscillation source 23, thereby to establish periodic net discharge of the capacitor 10. Representative of such an interruption means is the switching device 26 connected at 30 via diode 31 to shunt the flow of charge current $I_r$ over timewise spaced predetermined time intervals, as for example are represented in FIG. 2 by the interval $t_2$ to $t'_1$. In this regard, those intervals may be established by device 26 responsive to auxiliary oscillations or clock pulses $f_x$ upon triggering of the device 26 by the output at 40 from a detector or comparator 32 in the manner now to be described.

FIG. 2 graphically represents the operation of the oscillator when the "variable" input current $I_v$ is constant. Waveform A shows the spacing of oscillator output pulses of frequency $f_v$; waveform B indicates the spacing of auxiliary oscillator or source pulses of frequency $f_x$; and waveform C depicts the time variance of the charge $Q_i$ stored on the capacitor, and proportional to the voltage $E_i$ at the capacitor 10.

Starting at the left end of waveform C, the capacitor 10 discharges at a rate governed by the current $I_v-I_c$, since at this time the current $I_r$ is shunted by device 26. Resistor 19 is chosen so that $I_c$ is much greater than $I_v$, causing the charge $Q_i$ on the capacitor to decrease through a threshold level $Q_o$. Correspondingly, the voltage $E_i$ at the capacitor and applied to comparator 32 in FIG. 1 drops through a threshold level $E_o$ causing the comparator to produce an output pulse indicated at $t_0$ in waveform A. The output pulse triggers device 26 to respond to pulses supplied by source 23, and indicated in waveform B. At $t_1$ corresponding to a chosen count of two pulses after $t_0$, for example, the device is set to apply the current $I_r$ to charge the capacitor. Between $t_1$ and $t_2$ corresponding to the time interval $$T=\frac{1}{2f_x}$$

between two pulses from source 23, the capacitor 10 is recharged at a rate $(I_v-I_c+I_r)$. At $t_2$ the next or third pulse from source 23 serves to reset the device 26, again shunting $I_r$, and the capacitor 11 discharges at a rate $(I_v-I_c)$. Accordingly, the frequency output $f_v$ of the oscillator is determined by the time interval $$\frac{1}{2f_v}$$

between negative going threshold axis crossings of the charge $Q_i$ on the capacitor 10. Also, device 26 operates as a counter and switch.

Between times $t_0$ and $t_0'$ on waveforms A and C, the charge on the capacitor has successively decreased, increased and decreased, and may be represented by the conservation of charge expression:

$$(I_v-I_c)(t_1-t_0)+(I_v-I_c+I_r)T+(I_v-I_c)(t_0'-t_2)=0 \quad (1)$$

The foregoing expression reduces to the expression:

$$(I_v-I_c)(t_0'-t_0)=-I_rT \quad (2)$$

which can be written as follows for the special case where $I_v$ is constant:

$$f_v=\frac{I_c-I_v}{I_r}f_x \quad (3)$$

For the more general case where $I_v$ is a time varying current quantity, the charge on the capacitor between times $t_0$ and $t_0'$ can be written as follows:

$$\int_{t_0}^{t_1}[I_v(t)-I_c]dt+\int_{t_1}^{t_2}[I_v(t)-I_c+I_R]dt+\int_{t_2}^{t_0'}[I_v(t)-I_c]dt=0 \quad (4)$$

The foregoing expression reduces to $$f_v=\frac{I_c-\bar{I}_v(t)}{I_r}\cdot f_x \quad (5)$$

where $\bar{I}_v(t)$ is the average value of the current over the period of the oscillator output frequency $f_v$. This equation may be solved using standard interative procedures.

Figure 3:
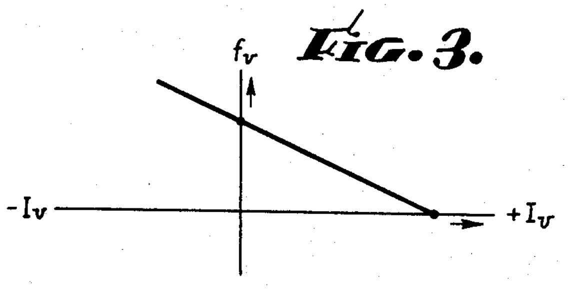
FIG. 3 is a graphical representation of the linear relationship between oscillator input current and output frequency.

In regard to the expressions (3) and (5) it will be noted from FIG. 3 that resistor 19 is chosen so that $I_c$ is always greater than $I_v$. Accordingly, when $I_v$ is zero, the output frequency $f_v$ will have a finite value determined by the expression $$\frac{I_c}{T_r}\cdot f_x \quad (6)$$

Also, $I_r$ is always greater than $I_c$ so that the output frequency $f_v$ is less than the control frequency $f_x$ and resulting in the resolution required for cycling the charge on the capacitor to produce the controlled output frequency $f_v$. It will also be noted that the output frequency $f_v$ is proportional to $f_x$, so that if the latter is produced upon variable speed playback of a recording carrying intelligence from which $I_v$ is derived, any playback speed error in $f_x$ is usable to compensate for playback speed error modulating $I_v$.

Finally, FIG. 3 clearly shows the linear relation between $I_v$ and $f_v$, the general equation therefor being as follows:

$$f_v=-aI_v+b \quad (7)$$

where $I_v$=variable input current
$a$=a selected parameter having frequency and current dimensions
$b$=a selected parameter having frequency and current dimensions.

Further, each of the parameters $a$ and $b$ is proportional to $f_x$.

In the foregoing description, functional block elements 23, 26, and 32 may be mechanized according to well known principles in the art.

We claim:

1. In combination, electrical charge storing means, detector means to produce an output frequency signal in response to detection of cycling of output voltage at the charge storing means, and a network including a summing junction connected with said charge storing means, a first unidirectional current flow leg connected to said junction to provide a charge current path, a second unidirectional current flow leg connected to said junction to provide a discharge current path, a third leg connected to said junction to provide a variable current path, and means to control variable current flow in said first leg for effecting cycling of the charge stored by said charge storing means as controlled by current flow in said legs.

2. The combination of claim 1 in which said means to control variable current flow in said first leg includes an auxiliary source of oscillations, and means connected with said first leg to periodically interrupt flow of charge current to said junction in response to operation of said auxiliary source of oscillations, thereby to establish periodic net discharge of said charge storing means.

3. The combination of claim 2 in which said detector means is connected with the charge storing means to detect an output voltage produced at the charge storing means upon discharge thereof to a predetermined threshold charge level.

4. The combination of claim 3 in which said means to periodically interrupt flow of charge current to said junction is operable to count said auxiliary oscillations upon triggering by the output frequency signal, and includes a switch connected to shunt said charge current flow over a time interval established by said counting.

5. The combination of claim 2 wherein the charge stored is cycled at a frequency $f_v$ determined by the expression:

$$f_v=\frac{I_c-\bar{I}_v}{Ir}f_x$$

wherein:

$\bar{I}_v$=a value equal to the variable current averaged over one cycle of the frequency $f_v$
$I_r$=predetermined charge current
$I_c$=predetermined discharge current
$f_x$=frequency (greater than $f_v$) of oscillations from auxiliary source.

6. The combination of claim 5 in which said auxiliary source of oscillations comprises a crystal controlled oscillator.

7. The combination of claim 5 in which said auxiliary source of oscillations comprises a reference frequency recording on which an intelligence signal is synchronously recorded, and said network includes a source deriving said variable current from said intelligence signal.

References Cited

UNITED STATES PATENTS

| | | | |
|---|---|---|---|
| 3,252,108 | 5/1966 | Gregory | 331—177 |
| 3,253,237 | 5/1966 | Runyan | 332—16 |
| 3,290,617 | 12/1966 | Bellem | 332—16 |

ALFRED L. BRODY, *Primary Examiner.*